United States Patent

Katona et al.

[11] Patent Number: 5,762,659
[45] Date of Patent: Jun. 9, 1998

[54] WASTE PROCESSING

[76] Inventors: Paul G. Katona, 2355 N. San Antonio Ave., Upland, Calif. 91786; John Jasbinsek, 967 W. Harvard Pl., Ontario, Calif. 91762

[21] Appl. No.: 837,698

[22] Filed: Feb. 19, 1992

Related U.S. Application Data

[63] Continuation of Ser. No. 490,759, Mar. 8, 1990, abandoned.

[51] Int. Cl.$^6$ ............................................. A62D 3/00
[52] U.S. Cl. .................... 48/197 R; 423/210.5; 588/201
[58] Field of Search ..................... 48/197 R, 203, 48/209, 92; 201/11; 423/210.5; 588/201

[56] References Cited

U.S. PATENT DOCUMENTS

| | | | |
|---|---|---|---|
| 16,480 | 1/1857 | Grant | 48/92 |
| 107,809 | 9/1870 | Pond et al. | 48/92 |
| 2,612,444 | 9/1952 | Rummel | 48/92 |
| 3,563,029 | 2/1971 | Lowes | 423/210.5 |
| 3,690,808 | 9/1972 | St. Pierre | 48/92 |
| 3,718,708 | 2/1973 | Ozawa et al. | 48/92 |
| 3,845,190 | 10/1974 | Yosim et al. | 588/201 |
| 3,954,938 | 5/1976 | Meissner . | |
| 3,998,626 | 12/1976 | Baum et al. . | |
| 4,062,607 | 12/1977 | Knuyysel et al. | 48/92 |
| 4,207,298 | 6/1980 | Erickson . | |
| 4,246,255 | 1/1981 | Grantham | 423/210.5 |
| 4,247,732 | 1/1981 | Fey . | |
| 4,317,684 | 3/1982 | Hooykaas | 588/201 |
| 4,345,990 | 8/1982 | Fahlstrom | 48/92 |
| 4,410,499 | 10/1983 | Aiken | 423/210.5 |
| 4,436,529 | 3/1984 | Fahlstrom et al. | 218/92 |
| 4,469,661 | 9/1984 | Shultz | 423/210.5 |
| 4,496,369 | 1/1985 | Torneman | 48/92 |
| 4,511,372 | 4/1985 | Axelsson | 48/92 |
| 4,552,667 | 11/1985 | Schultz | 423/210.5 |
| 4,564,509 | 1/1986 | Shealy et al. | 423/210.5 |
| 4,574,714 | 3/1986 | Bach et al. . | |
| 4,599,141 | 7/1986 | Shultz | 423/210.5 |
| 4,602,574 | 7/1986 | Bach et al. | 201/11 |
| 4,632,690 | 12/1986 | Colwell et al. | 588/201 |
| 4,666,696 | 5/1987 | Shultz | 423/210.5 |
| 4,681,599 | 7/1987 | Obkircher | 48/92 |
| 4,775,392 | 10/1988 | Cordier et al. | 48/92 |
| 4,875,906 | 10/1989 | Apel | 48/197 R |
| 5,191,154 | 3/1993 | Nagel | 423/40.6 |

FOREIGN PATENT DOCUMENTS

| | | | |
|---|---|---|---|
| 2713864 | 10/1978 | Germany | 48/92 |
| 28 13 209 | 4/1979 | Germany . | |
| 27 50 725 | 5/1979 | Germany . | |
| 2750725 | 5/1979 | Germany | 48/92 |
| 2813209 | 10/1979 | Germany | 48/92 |
| 2095282 | 9/1982 | Germany | 48/197 R |
| 3542805 | 6/1987 | Germany | 48/209 |
| 3642103 | 6/1988 | Germany | 48/209 |
| 1535970 | 2/1976 | United Kingdom . | |
| 2 095 282 | 9/1982 | United Kingdom . | |
| 2140453 | 11/1984 | United Kingdom . | |
| 2189504 | 10/1987 | United Kingdom | 48/92 |

OTHER PUBLICATIONS

"Ajax Magnethermic Coreless Induction Melting Equipment", Ajax Magnethermic Corporation, Warren Ohio.

*Primary Examiner*—Timothy McMahon
*Attorney, Agent, or Firm*—Banner & Witcoff, Ltd.

[57] ABSTRACT

A process for atomically converting gaseous waste materials into nonhazardous forms and a medium BTU gas is described. The reactor includes molten layers of iron and reactive slag in an upwardly flowing reactor operated under oxygen lean conditions.

3 Claims, 3 Drawing Sheets

WASTE PROCESSING

This application is a continuation of application Ser. No. 07/490,759, filed Mar. 8, 1990, now abandoned.

FIELD OF THE INVENTION

The invention relates to a process for converting waste liquids, solids, and gases containing a broad spectrum of organic and inorganic toxic constituents into a clean medium BTU fuel gas and nonhazardous slag materials.

BACKGROUND OF THE INVENTION

Incinerated waste materials typically contain various amounts of SOx, NOx, and carbon dioxide which must be cleaned from the discharged gases to meet clean air regulations. Some waste sources produce gaseous oxides of heavy metals (e.g., cadmium and/or mercury) while others produce dioxins, furans, and fine particulates. The composition of the waste stream varies with the particular facility and with the waste incinerated. Because the incinerated wastes are quite stable and may vary in composition, cleaning the waste stream in a reliable manner can be difficult.

One manner of cleaning waste gases involves a series of discrete flue gas scrubbers, absorbers, and post-combustion processing devices. These units are serially linked with each step addressing only a small portion of the overall waste. Such agglomerations of devices are characterized by substantial capital expenditures, virtually continuous maintenance on at least some unit in the processing chain, and complicated operating controls.

A particularly promising form of waste treatment that avoids the use of many devices in series is a reactor containing molten metal or salt beds. This form of processing treats waste on an atomic level and can reduce a number of the chemical variable associated with cleaning waste streams.

U.S. Pat. No. 4,574,714 describes a thermal degradation process that injects a stream of waste material into or onto either a bath of molten iron or a bath of silicon containing iron, nickel and/or copper. Whichever is used, the bath has a temperature of at least 2500° F. and a carbon:oxygen ratio of less than 1.0, i.e., the process is under oxygen-rich conditions. According to the patent, considerable excess oxygen may be used if desired which forms substantial quantities of stable COx and NOx products. A slag layer may form up to about 90% of the bath as a heat reservoir for the pyrolitic degradation of the waste and as surface area for activating molecular oxygen.

Unfortunately, the oxygen-rich, thermal degradation products of the treatment process must still be treated and/or removed before the material is discharged into the atmosphere. Other post-dissociation products, like liberated hydrogen and chlorine, pose different problems because these material may recombine above the molten bath to form hydrochloric acid. Such post-dissociation products do not render the treatment process of great value since substantial additional processing is required. This difficulty and the quantities of stable oxide produced as products have inhibited general acceptance of processes using molten systems for treating waste gas streams.

It would be desirable to have a molten treatment process for waste streams that would treat a wide scope of waste materials and convert them into nonhazardous, useful forms.

It would also be beneficial to have a molten waste treatment process that would avoid the formation of stable oxidation products and the formation of hazardous post-treatment products.

SUMMARY OF THE INVENTION

It is an object of the invention to provide a process that has the flexibility to treat waste gas or gasified waste streams of various chemical compositions.

It is another object of the invention to provide a process that can convert the inorganic portion of a waste stream into an inert slag and the organic portion into a medium BTU fuel gas.

In accordance with these objects and others that will become apparent from the description herein, the process according to the invention comprises:

passing a waste gas stream upwardly and sequentially through a layer of molten iron and a layer of reactive slag under conditions comprising a carbon:oxygen ratio of greater than one, said conditions being sufficient to convert: (a) carbon, hydrogen, and oxygen containing portions of said waste stream into a product gas comprising a medium BTU fuel gas; and (b) remaining portions of said waste stream into nonhazardous compounds.

In a further embodiment, copper and/or lead layers may be used in addition to the molten iron layer to expand the scope of the materials that can be captured and converted in the process.

The process according to the invention permits hazardous and nonhazardous waste materials to be addressed on the atomic level and converted into, stable, completed forms even though the composition of the incoming waste stream may vary substantially. The reliability of the conversion reduces the possibilities of an accidental discharge of toxic materials, and also reduces the potential health and environmental problems associated with waste treatment.

In addition, the invention provides for the formation of a medium BTU fuel gas from the organic portions of wastes. This fuel gas is rich in CO and $H_2$ which makes the gas useful for a variety of commercially useful processes such as power generation or methanol production. Converting valueless waste into useful products serves to make the process of treating wastes more economical and efficient.

DETAILED DESCRIPTION OF THE INVENTION

1. The Feed

Figure 1:
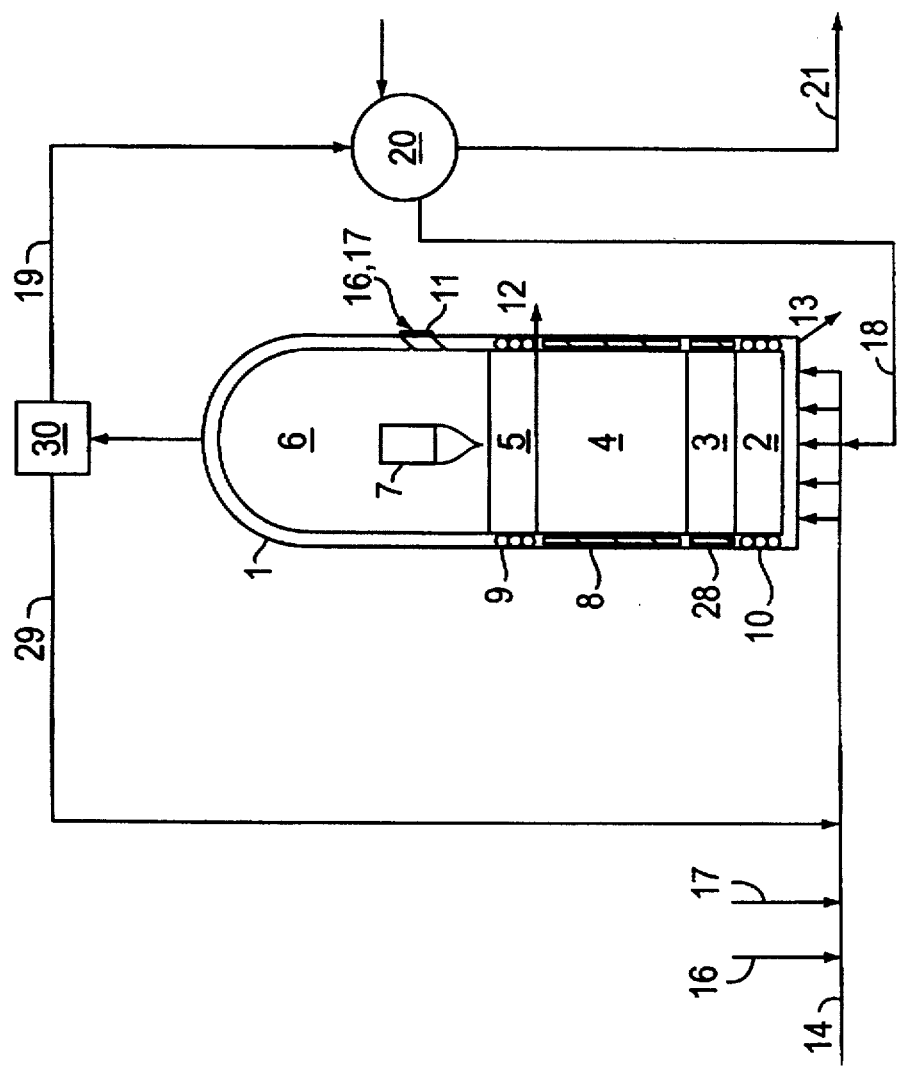
FIG. 1 illustrates a single treatment reactor with all optional molten metal layers.

The waste materials that can be treated by the invention are in a gaseous form and include industrial power plant products from the combustion of coal oil, or natural gas; nonhazardous incineration wastes from municipal or industrial facilities; and hazardous or toxic wastes from industrial or municipal incinerators. Solid and liquid wastes can also be treated by first converting the solids/liquids into a gas with suitable gasification means, e.g. an incinerator, at some point upstream of the treatment reactor. References herein to "waste gas feeds" are intended to encompass both gaseous and gasified solid and/or liquid wastes.

Waste gases that are fed to the present treatment system include carbon compounds (e.g. CO, $CO_2$, PCB's, furans, hydrocarbons, and dioxins), hydrogen, water vapor, sulfur compounds (e.g. SOx and $H_2S$), phosphorous compounds, alkali metals, heavy metals (e.g. Hg, Pb, Cd, Zn, Sn, and As), and inorganic particulates (e.g. asbestos and fly ash).

2. Process Condition

The process according to the invention uses a molten system comprising a layer of molten iron and a layer of reactive slag under high temperature reducing conditions to convert the waste gas components into useful or nonhazardous forms. The iron layer is desirably at a temperature within the range from about 2500° to about 2900° F., while the molten, reactive slag is about 2900° F. If the optional lead and/or copper layers are used, their temperatures would be above their melting points but below their vaporization temperatures. The copper layer desirably would have a centerline temperature within the range from about 2000° to about 2500° F. The lead layer desirably would have a bottom temperature within the range from about 660° to about 725° F. and a top surface temperature within the range from about 1800° to about 2200° F.

Measuring the temperature of each layer may be performed quantitatively (where the reactor design permits) or qualitatively. Suitable quantitative methods include physical and electrical probes, radiation emissions, and calculated temperatures from heat and/or mass balances. Qualitative measurements rely on exit gas composition readings. Between the two methods, the qualitative measurement is preferred requiring no more than routine experimentation to correlate the appropriate energy inputs with an acceptable output gas composition.

Conditions in the system cause the inorganic compounds in the waste gas to chemically reduce and/or thermally dissociate. The reduced and dissociated products are absorbed by the molten system which, in a series of self-regenerating reactions, cause the waste components to be converted into stable, nonhazardous compounds in the slag.

Carbon, hydrogen, and oxygen-containing materials are converted into a medium BTU product gas containing carbon monoxide and hydrogen. This product gas can be used for a variety of commercially valuable processes such as power generation or methanol production. For example, carbon dioxide dissociates to carbon monoxide at about 2000–2500° F. to form a product of clean, medium BTU gas having a calorific potential of about 200–320 BTU/cu.ft.

Maintaining a reducing environment involves: (1) controlling the C:O ratio inside the reactor at about 1 or higher, preferably greater than about 1.05 by adding one or more sources of carbon or oxygen, and (2) the presence of a sufficient elemental carbon in the molten iron layer to act as a buffer against elemental carbon fluctuations in the incoming waste gas feed. One place to control the C:O ratio is the incoming feed gas.

The oxygen:carbon ratio of the incoming feed can be monitored and controlled by a number of conventional methods. One method is historical information about the waste gas source: a source that has always produced a certain waste gas product distribution will probably continue to produce that distribution absent some form of change. A second method is a conventional, automatic means for measuring physical properties of the gas composition at the inlet to the molten treatment reactor. Other methods can be used and are readily identifiable for one in this art.

Another method for controlling the C:O ratio is by monitoring the output gas composition and adding carbon or oxygen sources to the system if unreduced gas components are detected. Preferred carbon sources are hydrocarbon gases, coal, coke, oil, and natural gas. Preferred oxygen sources are elemental oxygen, water vapor, and cellulosic materials. Gaseous sources are particularly preferred phases to minimize the loss of heat associated with changing phase in the molten metal.

Conveniently, the addition of carbon and/or oxygen sources can also be used as fuel sources for controlling the temperature of one or more layers. Carbon sources may be injected into the system with the feed gas or added via an introduction port in the reactor above the uppermost layer. Oxygen sources may be added by similar methods and/or injected into the iron layer to react with the elemental carbon absorbed therein.

The molten layers in the treatment reactor are in intimate interfacial contact in an upflowing vertical reactor. The slag layer will naturally float on the iron due to their inherent density differences. The desired size and thickness of each layer will depend on the quantity of waste gas to be treated and the concentration of contaminants within that gas. The iron layer should be sufficiently thick (as measured in the vertical path of the rising gas) to produce a residence time in the iron layer of about 0.5–2 seconds. This period is adequate time for the desired chemical conversion reactions to occur. Typical waste gas injection pressures are about 25–250 psig, preferably about 25–75 psig.

In addition, the iron layer should have a volume that is adequate to absorb sufficient carbon as a buffer for maintaining a carbon:oxygen ratio of greater than about 1. Since elemental carbon is absorbed up to about 4 wt. % in molten iron, it is preferred to operate the instant process at substantially this carbon saturation limit although lower levels of carbon absorption can be used if desired. A carbon source, such as coal or coke, can be added in minor quantities at the startup of the process to start the formation of a carbon buffer or from time-to-time if the carbon content exhibits signs of dropping below about 2% by weight. Iron filings may also be added from time to time to refresh the iron layer.

The reactive slag layer above the iron is a natural slag that is made reactive toward the incoming atomic pollutants by the addition of calcium oxide (lime) to achieve a base-to-acid ratio of greater than about 1, preferably above about 2, and even more preferably within a range from about 3.5 to about 6. The molar base to acid ratio of the slag is calculated as $(\%CaO+\%MgO)/(\%SiO_2+\%Al_2O_3)$. Appropriate oxides can be added from time to time as a powder or as small chunks to maintain the desired base:acid ratio. For economic operation, it is desirable to remove and readjust the composition when the base:acid ratio has fallen to about 2.

Calcium fluoride is preferably added on the order of 2–10 wt %, preferably 5–10% by weight to the initial slag as a flux to reduce the viscosity of the slag.

The added calcium oxide acts to bind sulfur from the iron into a stable complex in accord with equation 1 that, when cooled, may be safely stored in a landfill, used as a cement clinker, or used as a construction material.

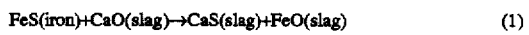  (1)

The calcium oxide interacts with the iron sulfide depending on both the carbon and the silicon content within the iron layer. For example, if the iron is saturated with carbon, the iron will transfer sulfur to the slag according to equation 2 thereby regenerating itself and forming product CO.

  (2)

If the iron layer has both carbon and silicon dissolved therein, the CaO will regenerate the iron while the silicon will be oxidized according to equation 3.

$$2FeS + 2CaO(slag) + Si(iron) \rightarrow 2CaS(slag) + Fe + SiO_2(slag) \quad (3)$$

Similar absorption and regeneration mechanisms will occur for other chemical species except mercury, e.g. chlorine, arsenic, alkali metals, asbestos, and flyash.

3. Additional Metal Layers

Molten iron and slag layers are particularly useful without any other molten layer treatments when the waste gas feed is a stack emission gas containing substantially only hydrocarbons, COx, SOx, $H_2S$, furans, dioxins, and fly ash. When the waste gas feed contains or is expected to contain significant quantities of organic and/or inorganic compounds, however, layers of copper and/or lead may be used to ensure adequate cleaning of the pollutants from the gas. Copper will collect below the iron layer but above any lead because copper has a specific gravity intermediate iron and lead.

Copper serves a number of activation and protection functions. The copper layer initiates the thermal disassociation processes for unburned hydrocarbon compounds in the incoming waste gas and activates certain chemical species toward more complete conversion. The copper layer removes sulfur and certain heavy metals by forming copper sulfides from the sulfur compounds of the waste gas and alloys with Zn, Cd, and Hg.

The copper layer also acts as a preheating stage for the incoming waste gas. This preheating conserves the energy in the iron layer for the more energy-intensive reactions, e.g. dissociating stable oxides like carbon dioxide into carbon monoxide.

A lead layer would be the bottom layer and is desirable for forming a molten amalgam with mercury introduced into the reactor with the waste materials. The amalgam can then be removed with appropriate handling procedures when routine maintenance is scheduled on the main reactor. Separating the mercury amalgam from the lead is performed according to conventional methods.

A bottom layer of lead does pose certain problems, though, because it is the first layer contacted by the incoming waste gas. The incoming waste gas could vaporize the lead if the temperature was sufficiently high. Such a result should be avoided by cooling the lead layer or the incoming waste gas.

An alternative arrangement instead of or in addition to a lead layer in the main reactor is a lead layer in a discrete downstream reactor. See, FIG. 1. Such a discrete treatment step is preferred when the incoming waste gas: (a) has substantial quantities of entrained liquids or solids (to avoid overloading the lead), (b) has an unknown or unpredictable composition (for practical and safe operation), or (c) if the gas mercury as either a regular or intermittent constituent. A downstream lead layer is particularly useful when high mercury concentrations are possible for the incoming wastes.

In addition to avoiding the energy losses and capital costs associated with cooling the waste gas feed, a downstream treatment reactor acts as an accessible location for removing the captured mercury without interrupting the operation of the main treatment reactor. A discrete reactor to capture mercury permits maintenance and replacement without having to drain or affect the iron, slag, and optional copper layers.

A downstream lead layer also backs up the mercury absorption capabilities of the copper layer since the mercury amalgam with copper is not a transitory reaction that regenerates the copper. The copper layer could become saturated with mercury if not replenished. Accordingly, a downstream lead layer will ensure that any mercury passing through the main reactor will not escape the system.

The downstream reactor is preferably of a design which permits frequent cleaning of the lead.

4. Reactor Heating Systems

The heat lost from each of the layers due to dissociation and reaction will reduce the temperature of the molten layers. One method of adding back that lost heat is with added carbon and/or oxygen sources (discussed above) that release heat upon reaction. These sources can also be the same sources used to control the C:O ratio within the reactor system.

Another method of adding heat to the system is with an electric arc (spark or plasma) or a gas burner located above the slag layer. The arc heating techniques contemplated for the present invention are those more conventionally used in the technology of metal smelting. Carbon or non-consumable metal electrodes may be used. The gas burners are also of conventional design for high temperature reactors and preferably burn methane or natural gas.

A third and preferred form of heating is induction heating. In the technique of heating via induction, a current is passed through a coil surrounding at least one of the molten metal layers. The current induces a flow of energy in the conductive layer and a magnetic field. The flow is resisted by the metal thereby generating heat. The magnetic field sets up an intra-layer circulation pattern that promotes interlayer material transfer. The induction coil can be built into the reactor wall or may be positioned around the outside of the reactor over a discrete length of the reactor that will extend over the length of at least one of the molten layers.

Induction heating is the preferred heat source alone or in combination with other heat sources. Most preferably, induction heating is used as the primary energy source with added chemical agents for minor temperature modifications. Induction heating is faster than oxidizing fuel, does not require preheating like a chemical fuel, and does not absorb activation energy from the system.

The attached figures can be used to help in understanding the present invention. FIG. 1 illustrates an upflow reactor 1 containing optional molten lead layer 2, optional molten copper layer 3, molten iron layer 4 and reactive slag layer 5. The positioning of copper layer 3 between lead layer 2 and iron layer 4 provides a convenient means for insulating lead layer 2 from the significantly higher temperatures of iron layer 4. In addition, copper layer 3 provides a measure of additional protection against the possible escape of mercury from lead layer 2.

Preferably, iron layer 4 constitutes at least about 50 vol% of all the molten layers used in main reactor 1, and reactor 1 exhibits a height-to-diameter ratio of about 3:1 although the exact dimensions will depend on the feed rate. Electric arc 7 is located above slag layer 5 in freeboard area 6. Freeboard area 6 preferably is at least about 50 vol % of the total volume in reactor 1 for gas separation from slag layer 5, electric arc 7, and for sampling port 11. One or more materials (e.g. carbonaceous sources or slag flux) or probes may be introduced into reactor 1 through sampling port 11. Excess slag from slag layer 5 may be withdrawn through drainage port 12. Bottom drain 13 will permit reactor 1 to be drained quickly in the event of accident or maintenance.

Induction coils 8 and 28 are arranged within the wall of reactor 1 to surround iron layer 4 and copper layer 3 respectively. Cooling coils 9 and 10 are positioned around slag layer 5 and lead layer 2. These cooling coils preferably contain a circulating gas or liquid, e.g. water, whose circulation rate is controlled by appropriate control monitors and valves (not shown).

Incoming waste gas 14 enters reactor 1 below lead layer 2 through a distribution means, e.g. a plurality of nozzles or tuyeres, a distribution plate, or other form of baffling. The incoming pressure is sufficient to overcome the hydrostatic force of the molten layers and allow the waste gas to rise through the reactor yet is sufficient to prevent flow of the molten materials back through the valve. An appropriate anti-backflow valve or gate may be used for additional protection Oxygen source 17 and carbon source 16 can be introduced into reactor 1 by freeboard area 6 or, preferably, in fluid communication with incoming waste gas 14. The flowrate of oxygen source 17 and carbon source 16 are controlled by appropriate composition and/or temperature sensors (not shown) to adjust for an oxygen lean stoichiometry within reactor 1 and maintain effective temperatures within each layer. Steam 18 produced by cooling treated gas 19 in heat exchanger 20 is a convenient source of both hydrogen and oxygen for producing a product gas 21 rich in carbon monoxide and hydrogen suitable for methanol production. Steam 18 is also useful for cooling the molten layers when introduced with incoming waste gas 14. The flowrate of steam 18 may be controlled to achieve suitable conversion temperatures in reactor 1.

Actual temperature reading need not be taken for each later. A compositional analysis of treated gas 19 will indicate whether reducing conditions are present within the layers and that inorganic materials are being bound in slag layer 5. In the event that conditions are not within the desired parameters, e.g. low C:O ratio or temperature, control system 30 will recycle the partially treated gas 29 for retreatment and activate or indicate appropriate oxygen, carbon, and/or energy inputs to the system to correct the conditions.

Figure 2:
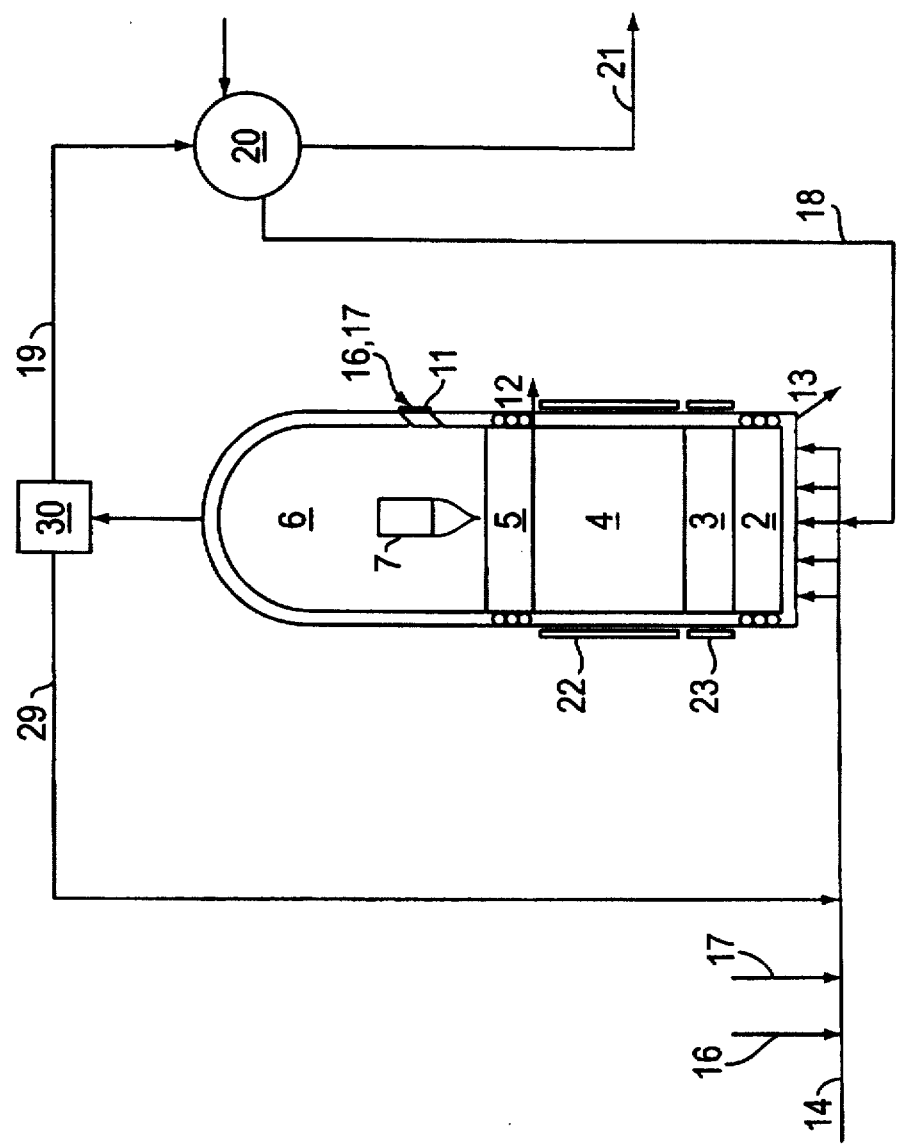
FIG. 2 depicts a single treatment reactor having external induction heating coils.

FIG. 2 illustrates a reactor similar to that shown in FIG. 1, and similar reference numerals are used for like elements. Induction coils 22 and 23 are located outside reactor 1 around copper layer 3 and iron layer 4, respectively.

Figure 3:
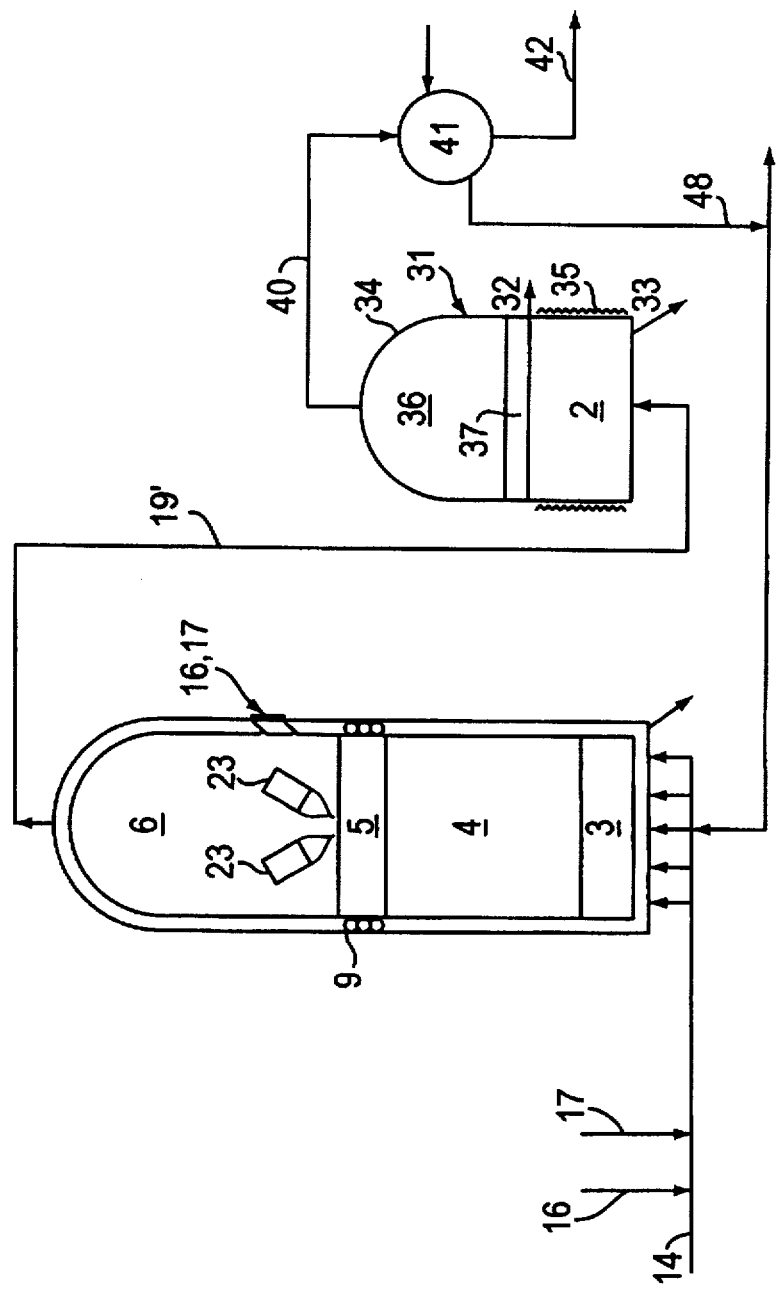
FIG. 3 shows a post-treatment reactor having a molten lead layer downstream of the main reactor without a lead layer.

FIG. 3 depicts a treatment system with a separate lead layer 2 for treating waste gas 14 when treated gas 19' contains mercury. In reactor 1, burners 23 oxidize a clean carbonaceous gas such as methane or natural gas to heat slag layer 5 although electric arc 7 may be used in place of burners 23.

Post-treatment reactor 34 contains molten lead layer 2 heated by resistance heater 35. Treated gas 19' is introduced below lead layer 2 by appropriate distribution or diffusion means of the same or similar design as those for reactor 1. Lead layer 2 will inherently form a layer of slag 37 will comprise low melting lead oxides and flux compounds.

Slag 37 above lead layer 2 can be withdrawn at discharge port 32. Second reactor bottom drain 33 can be used to completely empty reactor 34 for changing the lead as needed.

Like reactor 1, treated gas 40 passes through freeboard area 36 and heat exchanger 41 to produce cooled product gas 42. Steam 48 from heat exchanger 41 may be introduced into the bottom of reactor 1 or used for other purposes.

It is to be understood that the attached drawings are included to facilitate an understanding of the present invention. The drawings are not to scale and are not intended to act as limitations on the scope of the appended claims.

We claim:

1. A process for converting a gaseous or gasified waste stream into nonhazardous solid forms and a medium BTU fuel gas, said process comprising:

passing a waste stream consisting essentially of industrial power plant products from the combustion with oxygen of coal, oil, or natural gas; stack emission waste gas; gasifier waste gas; nonhazardous incineration waste gases from municipal or industrial facilities; or hazardous or toxic waste gases from industrial or municipal incinerators upwardly and sequentially through superimposed layers of molten iron and a reactive slag exhibiting a base:acid ratio of at least about one and comprising calcium fluoride under conditions comprising a carbon:oxygen ratio of greater than one, said conditions being sufficient to convert: (a) carbon, hydrogen, and oxygen containing portions of said waste stream into a product gas comprising a medium BTU fuel gas; and (b) remaining portions of said waste stream into nonhazardous slag solids and nonhazardous gases.

2. The process according to claim 1 wherein the reactive slag exhibits a base:acid ratio of at least about two.

3. The process according to claim 2 wherein the reactive slag exhibits a base:acid ratio within a range from about 3.5 to about 6.

* * * * *

UNITED STATES PATENT AND TRADEMARK OFFICE
CERTIFICATE OF CORRECTION

PATENT NO.: 5,762,659

DATED: June 9, 1998

INVENTOR(S): Paul G. Katona and John Jasbinsek

It is certified that an error appears in the above-identified patent and that said Letters Patent is hereby corrected as shown below:

In column 3, line 55, delete "oxygen:carbon" and insert therefor --carbon:oxygen--.

In column 4, line 63, equation 2, following "C", delete "(slag)" and insert therefor --(iron)--.

In column 5, line 44, delete "Fig. 1" and insert therefor --Fig. 3--.

In column 7, line 24, delete "later" and insert therefor --layer--.

In Figure 3, delete reference numeral "31".

On the title page,

In [76] Inventors:, delete "2355 N. San Antonio Ave., Upland, Calif., 91786" and insert therefor --1725 Redwood Way, Upland, Calif., 91784--.

Signed and Sealed this

Second Day of March, 1999

Attest:

Q. TODD DICKINSON

*Attesting Officer*    Acting Commissioner of Patents and Trademarks